(12) United States Patent
Suzawa et al.

(10) Patent No.: US 7,854,132 B2
(45) Date of Patent: Dec. 21, 2010

(54) CIRCULATION COOLING SYSTEM OF CRYOGENIC CABLE

(75) Inventors: Chizuru Suzawa, Osaka (JP); Takato Masuda, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 310 days.

(21) Appl. No.: 11/578,527

(22) PCT Filed: Feb. 18, 2005

(86) PCT No.: PCT/JP2005/002543

§ 371 (c)(1), (2), (4) Date: Oct. 13, 2006

(87) PCT Pub. No.: WO2006/087794

PCT Pub. Date: Aug. 24, 2006

(65) Prior Publication Data

US 2007/0234745 A1    Oct. 11, 2007

(51) Int. Cl.
*F25D 11/00* (2006.01)
*F25D 17/02* (2006.01)
(52) U.S. Cl. ............................ 62/118; 62/430; 62/509
(58) Field of Classification Search .................. 62/118, 62/509, 430, 6, 3.1, 3.2, 3.3, 3.4, 3.5
See application file for complete search history.

(56) References Cited

U.S. PATENT DOCUMENTS 3,851,274 A * 11/1974 Solin et al. .................... 372/35
5,199,274 A * 4/1993 Yoshida et al. ............. 62/228.4
5,402,648 A * 4/1995 Longsworth ................. 62/51.1
5,706,667 A * 1/1998 Iritani et al. ................... 62/230
2003/0097856 A1* 5/2003 Stokes ......................... 62/511
2004/0068999 A1* 4/2004 Jessen ......................... 62/222
2004/0144110 A1* 7/2004 Reeves et al. ................. 62/171
2005/0016184 A1* 1/2005 Zhang et al. ..................... 62/6

FOREIGN PATENT DOCUMENTS

| JP | 8-148044 | 6/1996 |
| JP | 10112925 | 4/1998 |
| JP | 2001-289546 | 10/2001 |
| RU | 17819 U1 | 4/2001 |
| SU | 508336 | 5/1976 |
| SU | 1097979 | 6/1984 |

OTHER PUBLICATIONS

Translation of Decision to Grant dated Aug. 15, 2008 for related Russian Patent Application No. 2006136797/09(040058).

* cited by examiner

*Primary Examiner*—Frantz F Jules
*Assistant Examiner*—Daniel C Comings
(74) *Attorney, Agent, or Firm*—Foley & Lardner LLP

(57) ABSTRACT

The present invention provides a circulation cooling system of a cryogenic cable in which a reserver unit can be made smaller and a conventional adjustment mechanism or adjustment task of the amount of a refrigerant within a reserver unit is not necessary. The circulation cooling system of a cryogenic cable according to the present invention has a reserver unit storing a refrigerant and a cable cooling portion cooling down a cable by the refrigerant sent from the reserver unit and the refrigerant sent from the cable cooling portion is returned to the reserver unit again for circulation. The system is characterized in that it has a refrigerant temperature adjustment mechanism to keep constant the amount of the refrigerant within the reserver unit.

17 Claims, 2 Drawing Sheets

CIRCULATION COOLING SYSTEM OF CRYOGENIC CABLE

TECHNICAL FIELD

The present invention relates to a circulation cooling system of a cryogenic cable such as a superconducting cable.

BACKGROUND ART

Cryogenic cables such as a superconducting cable are cooled down by a refrigerant such as liquid nitrogen or liquid helium. As a circulation cooling system for such cables, a system described in Japanese Patent Laying-Open No. 8-148044 is known, for example. In this circulation cooling system, a circulation circuit of the refrigerant is a closed circuit and the refrigerant can be circulated in the state where the refrigerant is not vaporized.

FIG. 2 schematically shows the system. The system includes a reserver unit 30 that stores a refrigerant 33, a pressure-feed pump 31 that pressure-feeds refrigerant 33, a pressure control device 36 that keeps a predetermined pressure within reserver unit 30, a heat exchange unit 32 that cools down refrigerant 33 to a predetermined temperature, a valve unit 34 that splits refrigerant 33 into a cable 35 (three cables exist and each cable is not shown) and the like.

The system repeats the cycle in which refrigerant 33 sent from reserver unit 30 is cooled down to the predetermined temperature at heat exchange unit 32 and is supplied to cable 35 and then returned to reserver unit 30.

Patent Document 1: Japanese Patent Laying-Open No. 8-148044 (Claims and FIG. 1)

DISCLOSURE OF THE INVENTION

Problems to be Solved by the Invention

In the above-mentioned conventional circulation cooling system, however, with respect to cable 35, reserver unit 30 is upstream of the circulation circuit and refrigerant 33 sent from reserver unit 30 is sent toward cable 35 after cooled down to the predetermined temperature at heat exchange unit 32. That is, since refrigerant 33 is returned to reserver unit 30 after cooling down cable 35, refrigerant 33 is raised in temperature due to heat generation at cable 35 and increases in volume due to heat expansion.

Correspondingly to the change in the amount of heat generation at cable 35, refrigerant 33 changes in volume as well. When large heat generation at cable 35 is expected, for example, refrigerant 33 needs to be sufficiently cooled down, correspondingly. In this case, conversely, refrigerant 33 contracts and decreases in volume.

Thus, since refrigerant 33 expands or contracts in volume due to the change in the temperature of refrigerant 33 and changes in liquid volume while the volume of each component other than reserver unit 30 such as a cooling portion of cable 35 and a piping is constant, the change in the liquid volume of the refrigerant needs to be absorbed within the capacity in reserver unit 30. Accordingly, the refrigerant storing capacity of reserver unit 30 has to be designed to absorb the change in liquid volume of the refrigerant, and as a result, reserver unit 30 needs to have a large capacity. Alternatively, in order to keep the amount of the refrigerant within reserver unit 30 constant, it has been necessary to provide an adjustment mechanism of the refrigerant amount for an adjustment task. Especially when the total amount of the refrigerant within the system is large or the system has a large temperature change, the reserver unit needs to have a large capacity or a refrigerant amount adjustment mechanism of a large capacity is needed, considering the expansion and contraction of volume.

One object of the present invention is to provide a circulation cooling system of a cryogenic cable that solves the problems of the conventional circulation cooling system and is capable of making a reserver unit smaller and does not need an adjustment mechanism or an adjustment task of the amount of the refrigerant within the reserver unit.

Means for Solving the Problems

A circulation cooling system of a cryogenic cable according to the present invention is characterized in that the system has a refrigerant temperature adjustment mechanism to keep constant the amount of the refrigerant within a reserver unit to achieve the object.

Specifically, the circulation cooling system of a cryogenic cable according to the present invention has a reserver unit storing a refrigerant and a cable cooling portion cooling down a cable by the refrigerant sent from the reserver unit and the refrigerant sent from the cable cooling portion is returned to the reserver unit again for circulation. The system is characterized in that it has a refrigerant temperature adjustment mechanism to keep constant the amount of the refrigerant within the reserver unit.

In the circulation cooling system of a cryogenic cable, the refrigerant temperature adjustment mechanism may include a sensor detecting the refrigerant temperature and a heat exchange unit adjusting the cooling capacity according to the detecting result of the sensor.

In the circulation cooling system of a cryogenic cable, the sensor detecting the refrigerant temperature may be located close to a refrigerant exit of the cable cooling portion.

In the circulation cooling system of a cryogenic cable, the heat exchange unit may be located between the refrigerant exit of the cable cooling portion and a refrigerant return inlet to the reserver unit.

In the circulation cooling system of a cryogenic cable, adjustment of the cooling capacity of the heat exchange unit may be performed by adjustment of the power for operating the heat exchange unit or the power supply frequency.

Effects of the Invention

Since the circulation cooling system of a cryogenic cable according to the present invention has the refrigerant temperature adjustment mechanism to keep the amount of the refrigerant within the reserver unit constant, it is not necessary to add volume to the reserver unit to absorb the change in the volume of the refrigerant, leading to a smaller reserver unit. Further, a mechanism or a task to adjust the refrigerant volume within the reserver unit is unnecessary.

When the sensor detecting the refrigerant temperature is located close to the exit of the cable cooling portion and the heat exchange unit is provided between the refrigerant exit of the cable cooling portion and the refrigerant return inlet to the reserver unit, the cooling capacity of the heat exchange unit can be adjusted more securely according to the change in heat generation of the cable while the change in the volume of the refrigerant due to heat generation of the cable can be prevented from directly affecting the reserver unit side. Therefore, the amount of the refrigerant within the reserver unit can be kept constant more correctly.

Further, when adjustment of the cooling capacity of the heat exchange unit is performed by adjustment of the power for operating the heat exchange unit or the power supply frequency, the heat exchange unit consumes less energy compared to a conventional system which is always operated at full power and adjusts the temperature by heating with a heater when cooling is excessive, leading to energy conservation.

Figure 1:
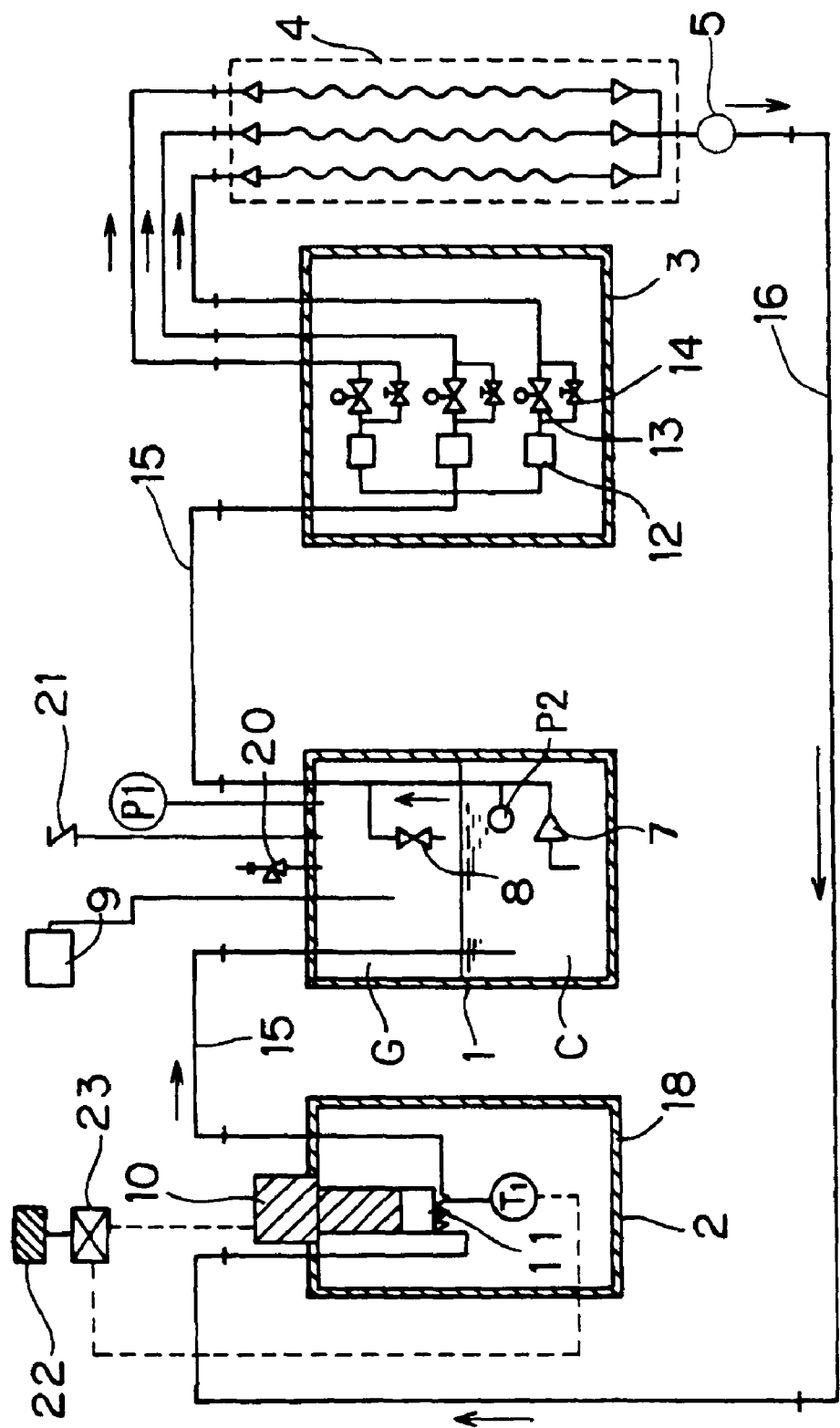
FIG. 1 schematically shows an example of a circulation cooling system of a cryogenic cable of the present invention.
Figure 2:
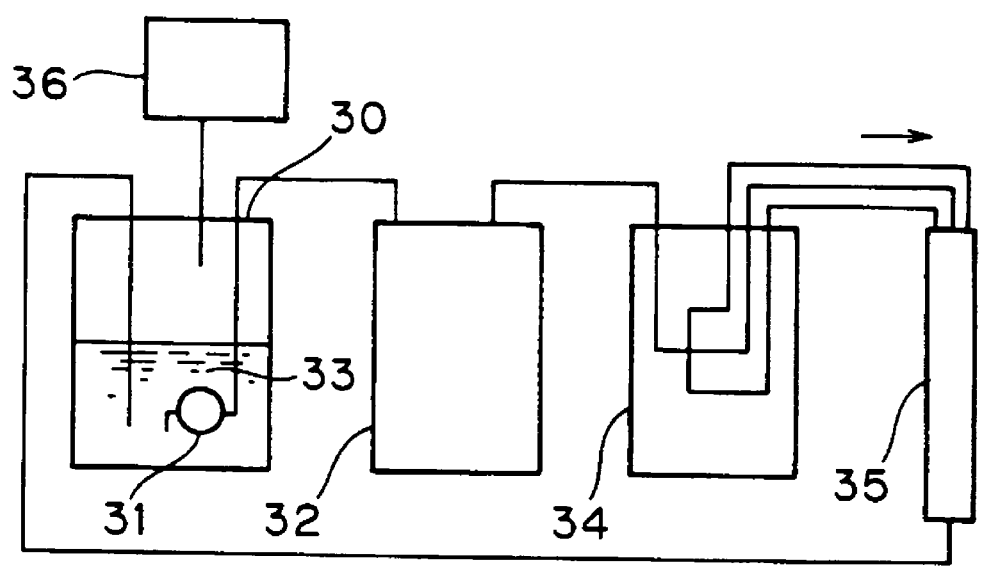
FIG. 2 schematically shows an example of a conventional circulation cooling system of a cryogenic cable.

DESCRIPTION OF THE REFERENCE SIGNS 1, 30: reserver unit, 2, 32: heat exchange unit, 3, 34: valve unit, 4: cable cooling portion, 5: sensor, 7, 31: pressure-feed pump, 8: bypass valve, 9, 36: pressure control device, 10: refrigerating machine, 11: cold head, 12: flow meter, 13: flow rate adjustment valve, 14: bypass valve, 15,16: piping, 18: vacuum insulated container, 20: safety valve, 21: check valve, 22: power supply, 23: power adjustment machine, C: refrigerant, G: gas, P1, P2: pressure gauge

BEST MODES FOR CARRYING OUT THE INVENTION

A refrigerant temperature adjustment mechanism to keep constant the amount of a refrigerant within a reserver unit has a function to keep constant the refrigerant temperature within a system. A representative example of the mechanism is one including a sensor detecting the refrigerant temperature and a heat exchange unit adjusting the cooling capacity according to the detecting result of the sensor. The refrigerant temperature is kept constant by increasing (when the temperature is to be lowered) or decreasing (when the temperature is to be increased) the cooling capacity of the heat exchange unit according to the change in the refrigerant temperature detected by the sensor.

The sensor detecting the refrigerant temperature may be any type if the sensor can provide sensitive and correct detection even at a cryogenic temperature. In a circulation cooling system of a cryogenic cable according to the present invention, it is usually the change in the amount of heat generation at the cable that affects the change in the refrigerant temperature most. Thus, preferably, the sensor is provided close to the exit of the cable cooling portion since the change in the amount of heat generation at the cable can be detected quickly and sensitive adjustment of the refrigerant temperature can be achieved.

The heat exchange unit may be also any type if the unit has sufficient cooling capacity and can provide adjustment of the cooling capacity according to the change in the refrigerant temperature. Further, a method of adjusting the cooling capacity is not limited particularly and a method commonly used in a conventional cooling system, i.e. the method in which a heat exchange unit having full power larger than the power corresponding to the expected maximum amount of change in the refrigerant temperature is always operated at full power and adjustment is performed by heating with a heater located at the heat exchange unit when the refrigerant temperature is lowered too much, can be employed. However, preferably, adjustment of the cooling capacity is performed by adjustment of the power for operating the heat exchange unit or the power supply frequency, since heating with a heater is unnecessary and energy required for cooling (power consumption) can be reduced.

The adjustment of the power supply frequency is performed by an inverter, for example. The cooling capacity of the heat exchange unit is dependent on the frequency. For example, when 60 Hz operation is changed to 30 Hz operation, the cooling capacity will be one half.

In the circulation cooling system of a cryogenic cable according to the present invention, the refrigerant is sent from the reserver unit to the cable cooling portion. When the sensor detecting the refrigerant temperature is located close to the exit of the cable cooling portion, for example, the heat exchange unit may be provided between the reserver unit and the cable cooling portion. When heat generation at the cable is large and the temperature close to the exit of the cable cooling portion is increased, the cooling capacity of the heat exchange unit can be increased and the increase in the refrigerant temperature can be suppressed.

However, in this case, since the cable cooling portion, i.e. the heat generating portion is downstream of the heat exchange unit, swift adjustment of the refrigerant temperature according to the change in the amount of heat generation at the cable, hence swift adjustment according to the change in the volume of the refrigerant based on the change in the refrigerant temperature cannot be achieved. That is, even when the refrigerant temperature changes due to the change in the amount of heat generation at the cable, and as a result, the volume of the refrigerant increases or decreases, the refrigerant itself that has been increased or decreased in volume cannot be directly adjusted in temperature and it is impossible to address the change in the volume of the refrigerant swiftly. Consequently, sensitive adjustment is difficult.

Thus, preferably, the heat exchange unit is provided between the refrigerant exit of the cable cooling portion and the refrigerant return inlet to the reserver unit. More preferably, the sensor detecting the refrigerant temperature is located close to the exit of the cable cooling portion and the heat exchange unit is provided between the refrigerant exit of the cable cooling portion and the refrigerant return inlet to the reserver unit. In this manner, adjustment of the cooling capacity of the heat exchange unit directly addressing the change in heat generation at the cable can be achieved while the amount of the refrigerant within the reserver unit can be kept constant more correctly without direct influence, on the reserver unit, of the change in the volume of the refrigerant due to heat expansion or heat contraction, since the refrigerant cooled down to a predetermined temperature at the heat exchange unit is supplied to the reserver unit.

In the following, the more preferable manner will be described more specifically referring to FIG. 1.

The system in FIG. 1 includes a reserver unit 1, a heat exchange unit 2, a valve unit 3, a cable cooling portion 4 and a sensor 5 detecting the refrigerant temperature (hereinafter referred to as sensor 5) as its main components.

Reserver unit 1 is a closed container to store a refrigerant C and includes a pressure-feed pump 7 to circulate the refrigerant and a pressure control device 9. Refrigerant C is pressurized by pressure-feed pump 7 for circulation, and its discharge pressure is adjusted by a bypass valve 8 within the reserver unit. For pressure-feed pump 7, a pump is used that can provide necessary flow rate even in a case where the refrigerant pressure decreases in the circulation circuit.

Pressure-feed pump 7 may be provided independently outside reserver unit 1. However, when the pump is provided within reserver unit 1 as in the present example, a vacuum insulated container can be shared and manufacturing cost of the system can be reduced. It is to be noted that P1 is a pressure gauge to measure the pressure within reserver unit 1, P2 is a pressure gauge to measure the pressure at the discharge portion of pressure-feed pump 7, 20 is a safety valve to protect reserver unit 1 from excessive rise in pressure and 21 is a check valve to prevent the air or the like from entering reserver unit 1.

Pressure control device 9 supplies a gas G to keep the pressure within reserver unit 1 almost constant and keep refrigerant C in a state where the refrigerant is not vaporized. The pressure control device, however, is not essential in the present invention. For gas G to be supplied, a gas having a lower boiling point or triple point than refrigerant C is used. When refrigerant C is liquid nitrogen, for example, helium is used.

In the conventional circulation cooling system described above, an automatic refrigerant supply mechanism (combination of a liquid level gauge and a supplier operating according to the measurement result) to maintain the amount of the refrigerant within reserver unit 1 constant may be provided. However, in the present invention, this mechanism is basically unnecessary.

Valve unit 3 has a function to split refrigerant C sent from reserver unit 1 through a piping 15 to supply to cable cooling portion 4. In the present example, in order to supply refrigerant C uniformly to three-phase power cables located within cable cooling portion 4, refrigerant C is divided into three branches and a flow meter 12, a flow rate adjustment valve 13 and a bypass valve 14 are provided for a respective branch.

Refrigerant C sent through valve unit 3 is supplied to cable cooling portion 4. In the present example, refrigerant C is supplied from one end of cable cooling portion 4 and at the other end, the three branches of refrigerant C corresponding to three phases are combined into one flow for discharge and then returned to heat exchange unit 2 side.

Within cable cooling portion 4, respective cable is cooled down by refrigerant C while refrigerant C is increased in temperature due to heat generation of the cable. The amount of the increase in temperature varies depending on the change in the amount of heat generation of the cable (i.e. the change in current).

Sensor 5 provided close to the refrigerant exit of cable cooling portion 4 detects the temperature of refrigerant C and the measurement result is fed back to a power adjustment machine 23 of heat exchange unit 2. Refrigerant C sent from sensor 5 is sent to heat exchange unit 2 through a piping 16.

Heat exchange unit 2 cools down refrigerant C sent from sensor 5 to a predetermined temperature. In the present example, a cold head 11 of a refrigerating machine 10 is kept in contact with a Cu block and a transport pipe of refrigerant C is wound around the Cu block for heat exchange by solid heat conduction. Further, although one heat exchange unit 2 is used in the present example, two or more units may be connected in series when the cooling capacity of one unit is not sufficient.

In the present example, heat exchange unit 2 is provided downstream of the exit side piping 16 of sensor 5 and upstream of a return piping to reserver unit 1 of refrigerant C. That is, the unit is located between the refrigerant exit of cable cooling portion 4 and the refrigerant return inlet to reserver unit 1.

Refrigerating machine 10 is supplied with power for operation from a power supply 22 for the heat exchange unit. Between power supply 22 and refrigerating machine 10 is provided a power adjustment machine 23 for operating the heat exchange unit. As described above, the temperature detected by sensor 5 is fed back and power adjustment machine 23 is controlled. Thus, the cooling capacity of heat exchange unit 2 is adjusted and the temperature of the return inlet to reserver unit 1 is controlled to be constant while the change in the volume of refrigerant C due to the change in the temperature of refrigerant C is prevented. For power adjustment machine 23, an inverter capable of arbitrarily changing the power supply frequency input to heat exchange unit 2 may be used.

It is to be noted that when the amount of the refrigerant existing between the heat generating portion, i.e. cable cooling portion 4 and heat exchange unit 2 is large, the change in the volume of the refrigerant due to heat expansion or heat contraction of the refrigerant becomes large. Accordingly, it is preferable that this amount of the refrigerant is small and heat exchange unit 2 is located close to the refrigerant exit of cable cooling portion 4, i.e. close to the exit of sensor 5.

Refrigerant C sent from heat exchange unit 2 is returned to reserver unit 1 through piping 15.

Reserver unit 1, heat exchange unit 2 and valve unit 3 are separately housed in a vacuum insulated container 18 and pipings 15, 16 constituting the circulation circuit are covered with a vacuum insulated layer. Thus, heat loss of the cooling system as a whole can be made smaller. It is to be noted that each unit 1, 2, 3, 15 and 16 may be vacuum insulated collectively, not separately.

INDUSTRIAL APPLICABILITY

The circulation cooling system of a cryogenic cable according to the present invention is used as a cooling system of a cable such as a superconducting cable that is used in a condition cooled down by a refrigerant. The system is particularly useful when downsizing or simplification of the mechanism is required.

The invention claimed is:

1. A circulation cooling system for a cryogenic cable comprising:
   a reserver unit for storing a refrigerant and a cable cooling portion for cooling down a cable by the refrigerant sent from said reserver unit, the system returning the refrigerant sent from said cable cooling portion to said reserver unit again for circulation; and
   a pressure feed pump located within the reserver unit configured to circulate the refrigerant in liquid form;
   wherein the system has a refrigerant temperature adjustment mechanism to keep constant an amount of the refrigerant within said reserver unit and the refrigerant temperature adjustment mechanism is configured to adjust the temperature of the refrigerant to maintain the refrigerant in liquid form; and
   wherein the refrigerant temperature adjustment mechanism includes a heat exchange unit that has a copper block in heat flow communication with a cold head of a refrigerating machine with a transport pipe holding the refrigerant wound around the copper block;
   wherein the system includes a fluid flow path that is in fluid flow communication with the cable cooling portion, the refrigerant temperature adjustment mechanism, and the pressure feed pump; wherein the fluid flow path is configured to be a closed flow path for the refrigerant; and
   wherein the reserver unit includes a closed container that is configured to allow the refrigerant to flow from the reserver unit through the fluid flow path.

2. The circulation cooling system of a cryogenic cable according to claim 1, wherein said refrigerant temperature adjustment mechanism includes a sensor detecting a temperature of the refrigerant and a heat exchange unit adjusting a cooling capacity according to a detecting result of said sensor.

3. The circulation cooling system of a cryogenic cable according to claim 2, wherein said sensor detecting said temperature of the refrigerant is located close to a refrigerant exit of said cable cooling portion and the sensor is located directly up stream from the heat exchange unit.

4. The circulation cooling system of a cryogenic cable according to claim 2, wherein said heat exchange unit is located between a refrigerant exit of said cable cooling portion and a refrigerant return inlet to said reserver unit.

5. The circulation cooling system of a cryogenic cable according to claim 2, wherein adjustment of the cooling capacity of said heat exchange unit is performed by adjustment of power supply frequency for operating said heat exchange unit.

6. The circulation cooling system of a cryogenic cable according to claim 1, wherein the reserver comprises a vacuum insulated container and the pressure feed pump is located within the insulated container.

7. The circulation cooling system of a cryogenic cable according to claim 1, wherein the fluid flow path that is in fluid flow communication with the cable cooling portion, the refrigerant temperature adjustment mechanism, and the pressure feed pump; and wherein the pressure feed pump is configured to circulate the refrigerant in liquid form throughout the fluid flow path.

8. The circulation cooling system of a cryogenic cable according to claim 7, wherein the system is configured to constantly maintain the refrigerant in liquid form through the entire closed flow path.

9. The circulation cooling system of a cryogenic cable according to claim 1, wherein the system is configured to constantly maintain the refrigerant in liquid form.

10. The circulation cooling system of a cryogenic cable according to claim 1, further comprising a pressure control device configured to supply a gas to maintain a constant pressure within the reserver unit.

11. The circulation cooling system of a cryogenic cable according to claim 1, wherein the refrigerant temperature adjustment mechanism that includes the copper block is located between the reserver unit and a temperature sensor in a refrigerant fluid flow path.

12. The circulation cooling system of a cryogenic cable according to claim 1, wherein the refrigerant temperature adjustment mechanism is located outside the reserver unit.

13. The circulation cooling system of a cryogenic cable according to claim 1, wherein adjusting the cooling capacity comprises the heat exchange unit cooling at full capacity and the heat exchange unit further comprises a heater for heating the refrigerant to adjust the refrigerant temperature based on the detected sensor readings.

14. The circulation cooling system of a cryogenic cable according to claim 1, wherein the closed container of the reserver unit is sealed to maintain fluid pressure inside the sealed container.

15. The circulation cooling system of a cryogenic cable according to claim 1, wherein the closed container of the reserver has an enclosed internal volume and is configured to hold fluid under a pressure that is different from environmental pressure outside the closed internal volume.

16. The circulation cooling system of a cryogenic cable according to claim 15, wherein the closed container of the reserver is sufficiently sealed to prevent evaporation of refrigerant from the enclosed internal volume of the closed container.

17. The circulation cooling system of a cryogenic cable according to claim 1, wherein the closed container is sufficiently sealed to prevent evaporation of refrigerant from the closed container.

* * * * *